US006625323B2

(12) United States Patent
Henderson et al.

(10) Patent No.: US 6,625,323 B2
(45) Date of Patent: *Sep. 23, 2003

(54) METHOD FOR COMPRESSING AND DECOMPRESSING DIGITAL HAVING TEXT

(75) Inventors: Thomas A. Henderson, Rochester, NY (US); Majid Rabbani, Pittsford, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,032

(22) Filed: Sep. 25, 1998

(65) Prior Publication Data

US 2001/0051003 A1 Dec. 13, 2001

(51) Int. Cl.[7] .............................. G06K 9/34; G06K 9/36; G06K 9/38; H04B 1/66
(52) U.S. Cl. ................ 382/251; 382/232; 382/233; 382/239; 382/172; 382/173; 382/253; 375/240.01; 375/240.02; 375/240.03; 375/240.22
(58) Field of Search .......................... 382/173–181, 382/232–233, 251–254, 250, 239; 375/240.22, 240.2, 240.03, 240.01, 240.02

(56) References Cited

U.S. PATENT DOCUMENTS

| 5,546,474 | A | * | 8/1996 | Zuniga | 382/176 |
| 5,568,571 | A | * | 10/1996 | Willis et al. | 382/254 |
| 5,742,703 | A | * | 4/1998 | Lin et al. | 382/176 |
| 5,751,846 | A | * | 5/1998 | Higgins-Luthman et al. | 382/232 |
| 5,757,975 | A | | 5/1998 | Eschbach et al. | |
| 5,774,634 | A | | 6/1998 | Honma et al. | |
| 5,778,092 | A | * | 7/1998 | Macleod et al. | 382/176 |
| 5,850,484 | A | * | 12/1998 | Beretta et al. | 382/250 |
| 5,883,979 | A | * | 3/1999 | Beretta et al. | 382/251 |
| 5,982,937 | A | * | 11/1999 | Accad | 382/239 |
| 6,175,650 | B1 | * | 1/2001 | Sindhu et al. | 382/239 |
| 6,198,848 | B1 | * | 3/2001 | Honma et al. | 382/232 |
| 6,252,994 | B1 | * | 6/2001 | Nafarieh | 382/253 |

FOREIGN PATENT DOCUMENTS

EP 0 626 790 A1 11/1994

* cited by examiner

Primary Examiner—Andrew W. Johns
Assistant Examiner—Amir Alavi
(74) Attorney, Agent, or Firm—Peyton C. Watkins; Stephen H. Shaw

(57) ABSTRACT

A method for compressing a digital image having both saturated text and/or line art and pictorial imagery, the method comprises the steps of: receiving the digital image as blocks of pixels; analyzing the block content to determine if all or any combination of the saturated text and/or line art, pictorial imagery or other types of image data are present; assigning the saturated text and/or line art, the pictorial imagery, the other types of image data to one of a plurality of categories; compressing the block of saturated text and/or line art, if any, according to a first predetermined compression method; compressing the pictorial imagery, if any, according to a second predetermined compression method; compressing the other types of imagery, if any, according to other predetermined compression methods; and providing means of conveying the image categories to a decoder.

25 Claims, 4 Drawing Sheets

| 255 | 0 | 0 | 0 | 0 | 0 | 0 | 255 |
| --- | --- | --- | --- | --- | --- | --- | --- |
| 0 | 0 | 255 | 0 | 0 | 255 | 0 | 0 |
| 0 | 0 | 0 | 255 | 0 | 0 | 255 | 0 |
| 255 | 255 | 255 | 255 | 255 | 0 | 0 | 255 |
| 255 | 0 | 255 | 255 | 0 | 0 | 0 | 0 |
| 0 | 255 | 255 | 0 | 255 | 0 | 255 | 0 |
| 255 | 255 | 0 | 0 | 0 | 255 | 255 | 0 |
| 0 | 255 | 0 | 0 | 0 | 0 | 0 | 255 |

*FIG. 2a*

| 144 | 112 | 112 | 112 | 112 | 112 | 112 | 144 |
| --- | --- | --- | --- | --- | --- | --- | --- |
| 112 | 112 | 144 | 112 | 112 | 144 | 112 | 112 |
| 112 | 112 | 112 | 144 | 112 | 112 | 144 | 112 |
| 144 | 144 | 144 | 144 | 144 | 112 | 112 | 144 |
| 144 | 112 | 144 | 144 | 112 | 112 | 112 | 112 |
| 112 | 144 | 144 | 112 | 144 | 112 | 144 | 112 |
| 144 | 144 | 112 | 112 | 112 | 144 | 144 | 112 |
| 112 | 144 | 112 | 112 | 112 | 112 | 112 | 144 |

*FIG. 2b*

| −28 | 17 | 12 | −11 | −4 | 4 | −1 | 1 |
| --- | --- | --- | --- | --- | --- | --- | --- |
| −13 | −7 | −9 | −5 | 18 | 16 | 24 | 0 |
| −27 | −22 | 31 | 14 | −10 | −20 | 6 | −15 |
| 3 | 11 | 5 | 11 | −5 | 2 | 9 | 20 |
| 4 | 16 | 18 | −23 | 44 | −13 | 13 | −7 |
| 23 | 0 | 21 | 15 | 13 | −3 | −20 | −4 |
| −11 | −16 | −2 | −17 | 8 | −2 | −32 | 11 |
| −20 | −2 | 7 | 13 | 6 | 38 | −2 | −19 |

*FIG. 2c*

| | | | | | | | |
|---|---|---|---|---|---|---|---|
| 8 | 8 | 8 | 8 | 9 | 10 | 12 | 14 |
| 8 | 8 | 8 | 8 | 9 | 10 | 12 | 15 |
| 8 | 8 | 8 | 9 | 10 | 12 | 14 | 32 |
| 8 | 8 | 9 | 11 | 13 | 15 | 32 | 32 |
| 9 | 9 | 10 | 13 | 16 | 32 | 32 | 32 |
| 10 | 10 | 12 | 15 | 32 | 32 | 32 | 32 |
| 12 | 12 | 14 | 32 | 32 | 32 | 32 | 32 |
| 14 | 15 | 32 | 32 | 32 | 32 | 32 | 32 |

*FIG. 2d*

| | | | | | | | |
|---|---|---|---|---|---|---|---|
| −32 | 16 | 16 | −8 | 0 | 0 | 0 | 0 |
| −16 | −8 | −8 | −8 | 18 | 20 | 24 | 0 |
| −24 | −24 | 32 | 18 | −10 | −24 | 0 | 0 |
| 0 | 8 | 9 | 11 | 0 | 0 | 0 | 32 |
| 0 | 18 | 20 | −26 | 48 | 0 | 0 | 0 |
| 20 | 0 | 24 | 15 | 0 | 0 | −32 | 0 |
| −12 | −12 | 0 | −32 | 0 | 0 | −32 | 0 |
| −14 | 0 | 0 | 0 | 0 | 32 | 0 | −32 |

*FIG. 2e*

| | | | | | | | |
|---|---|---|---|---|---|---|---|
| 139 | 114 | 109 | 107 | 113 | 96 | 123 | 142 |
| 121 | 101 | 139 | 104 | 122 | 158 | 105 | 116 |
| 102 | 122 | 118 | 153 | 97 | 124 | 132 | 117 |
| 149 | 138 | 137 | 142 | 140 | 108 | 119 | 137 |
| 143 | 110 | 142 | 153 | 111 | 111 | 104 | 117 |
| 113 | 143 | 141 | 106 | 143 | 111 | 140 | 116 |
| 143 | 149 | 110 | 103 | 120 | 149 | 145 | 111 |
| 116 | 143 | 112 | 113 | 115 | 111 | 112 | 144 |

*FIG. 2f*

| 255 | 0 | 0 | 0 | 0 | 0 | 0 | 255 |
|---|---|---|---|---|---|---|---|
| 0 | 0 | 255 | 0 | 0 | 255 | 0 | 0 |
| 0 | 0 | 0 | 255 | 0 | 0 | 255 | 0 |
| 255 | 255 | 255 | 255 | 255 | 0 | 0 | 255 |
| 255 | 0 | 255 | 255 | 0 | 0 | 0 | 0 |
| 0 | 255 | 255 | 0 | 255 | 0 | 255 | 0 |
| 255 | 255 | 0 | 0 | 0 | 255 | 255 | 0 |
| 0 | 255 | 0 | 0 | 0 | 0 | 0 | 255 |

FIG. 2g

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

FIG. 2h

| 8 | 8 | 8 | 8 | 8 | 8 | 8 | 8 |
|---|---|---|---|---|---|---|---|
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |

FIG. 2i

METHOD FOR COMPRESSING AND DECOMPRESSING DIGITAL HAVING TEXT

APPENDIX

The disclosure in the appendix of this patent disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

FIELD OF THE INVENTION

The invention relates generally to the field of digital image compression and, more particularly, to such compression that recognizes text and uses a predetermined strategy for compressing and decompressing the text.

BACKGROUND OF THE INVENTION

It is well known to employ transform coding of digital images for bandwidth compression prior to storage or transmission over a limited bandwidth communication channel. In a typical prior art digital image compression/decompression system employing transform coding, such as the one used in the JPEG International standard (*Digital compression and coding of continuous-tone still images-Part I: Requirements and Guidelines* (*JPEG*), ISO/IEC International Standard 10918-1, ITU-T Rec. T.81, 1993, or W. B. Pennebaker and J. L. Mitchell, *JPEG Still Image Data Compression Standard,* Van Nostrand Reinhold, New York, 1993), the digital image is formatted into blocks (e.g. 8×8 pixels) and a linear transformation such as a discrete cosine transform (DCT) is applied to each block to generate 8×8 blocks of transform coefficients. Theoretically, for images modeled as a first-order Markov source with a correlation coefficient close to unity, the DCT is very close to the Karhunen-Loeve (KL) Transform that is optimal in reducing correlation. For photographic type images, the DCT still provides very good decorrelation properties and, unlike the KL transform that is image-dependent and does not yield itself to straightforward computation, it can be efficiently implemented in software or hardware. The DCT coefficients are then normalized and quantized using a uniform quantizer.

In the JPEG standard, the user can specify a different quantizer step size for each coefficient. This allows the user to control the resulting distortion due to quantization in each coefficient. The quantizer step sizes may be designed based on the relative perceptual importance of the various DCT coefficients or according to other criteria depending on the application. The 64 quantizer step sizes corresponding to the 64 DCT coefficients in each 8×8 block are specified by the 1-byte elements of an 8×8 user-defined array, called the normalization matrix, or the quantization matrix, or the "Q-table". Each block of quantized transform coefficients is ordered into a one-dimensional vector using a zig-zag scan that rearranges the quantized coefficients in the order of decreasing energy. This usually results in long runs of zero quantized values that can be efficiently encoded by run-length coding. Each nonzero quantized value and the number of zero values preceding it are encoded as a {runlength/amplitude} pair using a minimum redundancy coding scheme such as Huffman coding. The binary coded transform coefficients along with an image header containing information such as the Q-table specification, the Huffman table specification, and other image related data are either stored or transmitted over a limited bandwidth channel.

At the receiver, the image signal is decoded from the binary bitstream using operations that are the inverse of those employed at the encoder. This technique is capable of producing advantageously high image compression ratios, thereby saving significant storage space or enabling low bit rate transmission of digital images over limited bandwidth communication channels.

Although the presently known and utilized method and system for compressing images are satisfactory, improvements are always desirable. In particular, when the system described above is used to compress an image that contains both photographic data and text, undesirable artifacts such as ringing and blocking can occur. This is due to the fact that text contains large intensity variations from one pixel to another that does not compress well with DCT-based schemes.

SUMMARY OF THE INVENTION

The present invention is directed at overcoming one or more of the problems set forth above. Briefly summarized, according to one aspect of the present invention, the invention resides in a method for compressing a digital image having both saturated text and/or line art and pictorial imagery, the method comprising the steps of: receiving the digital image as blocks of pixels; analyzing the block content to determine if all or any combination of the saturated text and/or line art, pictorial imagery or other types of image data are present; assigning the saturated text and/or line art, the pictorial imagery, the other types of image data to one of a plurality of categories; compressing the block of saturated text and/or line art, if any, according to a first predetermined compression method; compressing the pictorial imagery, if any, according to a second predetermined compression method; compressing the other types of imagery, if any, according to other predetermined compression methods; and providing means of conveying the image categories to a decoder.

It is an object of the present invention that, knowing a priori that a given block contains saturated text only, the compression scheme is modified in such a way as to take advantage of this information without a significant modification in the software or hardware implementation. The present invention utilizes knowledge of the type of image to be compressed in the compression process for producing higher quality images.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of compressing text and/or line art so that the sharp boundary information is preserved while simultaneously achieving a higher compression of the image data than is otherwise possible, using a standard JPEG compression technique.

BRIEF DESCRIPTION OF THE DRAWINGS

FIGS. 2A–2I are drawings illustrating exemplary 8×8 blocks of pixel information through various stages of the present invention.

DETAILED DESCRIPTION OF THE INVENTION

In the following description, the present invention will be described in the preferred embodiment as a software program. It is also noted that that a general purpose computer can be used to implement the present invention, and that such a general purpose computer will not be discussed in detail herein as such computers are well known in the art. Those skilled in the art will readily recognize that the equivalent of such software may also be constructed in hardware.

A computer program written in C language for performing the steps of determining the block type is contained in the Appendix.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
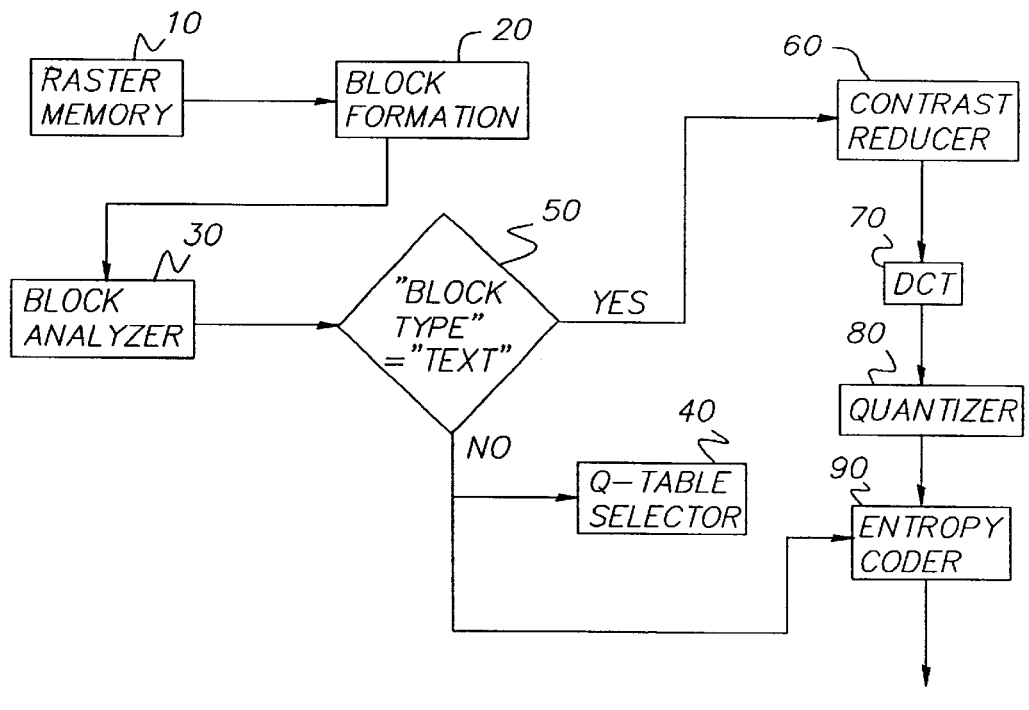
FIG. 1 is a block diagram illustrating the encoder employed in the present invention.

Referring to FIG. 1, there is illustrated a block diagram of the present invention. It is noted that before utilizing the present invention, a scene is captured in digital form by any suitable means, such as by scanning a photograph, capturing a scene via a digital camera, composing an image using a software program or any other similar means (all of which are well known and are not disclosed in detail herein). The present invention will use the example of a byte sized pixel which provides 256 values, but other pixel sizes can be used. The digital image pixels are then input into any suitable page description language, such as a "PostScript" interpreter, configured so that images having all pictorial content exclude the values of 0 and 255 from the image; the purpose of which will later become readily apparent. Means of achieving such a condition are well known in the art and will not be discussed in detail herein. Given the above, a digital image having a plurality of pixels each having code values representing its color content is inputted into raster memory 10. The image is sent to and segmented by a block former 20 into 8×8 blocks of pixels (FIG. 2A is an example). To classify the block content, the 8×8 blocks of pixels from the block former 20 are inputted into a block analyzer 30 which determines the type of the block. The output of the block analyzer 30 is the 8×8 block and a parameter referred to as "block_type." In a preferred embodiment of the present invention, each block is classified into one of four types. The four types used are saturated text and line art only ("block_type"="text"), pictorial image only ("block_type"="image"), both text and pictorial image ("block_type"="mixed"), or a block having a combination of only two different code values excluding 0 and 255 ("block_type"="bi-level"). It is clear that those skilled in the art may use a slightly different number of block types, at least one of which is text, depending on the application without departing from the scope of the invention. It facilitates understanding to note that each block type will have a unique Q-table specified by the Q-table selector 40, and that the "block_type" parameter for each block will be also included in the compressed bitstream that represents that block to specify to the decoder the Q-table to be used during decoding, as will later become apparent. The following describes the operation of the block analyzer 30.

If the block consists of saturated text or lines only, it will contain pixels with only values of 0 and 255. Therefore, for determining if the image block is text, the analyzer 30 checks if the block contains only values of 0 and 255. If it does, the analyzer 30 outputs "block_type"="text".

If the image block contains a mixed block, the image block will have at least one value between 0 and 255 inclusive in addition to at least one value equal to 0 or 255. Thus, for determining if the image block is a mixed block, the analyzer 30 determines if the block contains any values between 0 and 255 inclusive along with at least one value equal to 0 or 255. If it does, the analyzer 30 outputs "block_type"="mixed".

If the image block contains a bi-level image, the image block will have just two unique values selected from the range of 1 to 254. Thus, for determining if the image block is a bi-level block, the analyzer 50 finds first one value, and then a second value, both between 1 and 254 inclusive, but finds no third value when all pixels of a block have been examined. Additionally, it is required that the difference between the first and second value be at least some minimum, 16 for example, so that noise or other stray patterns are not needlessly classified. If such conditions prevail, the analyzer 30 outputs "block_type"="bi-level".

Finally, if the image block contains all image, the 8×8 image block will have values between 1 and 254 inclusive due to the result of the page description interpreter or any suitable agent excluding values of 0 and 255, as described above. Thus, for determining if the image block is all image, the analyzer 30 determines if the block contains at least three unique values between 1 and 254 inclusive. If it does, the analyzer 30 outputs "block_type"="image".

The complete logic employed in a preferred embodiment of the present invention to determine the block type is in the Appendix.

The comparator block 50 checks to determine if "block_type"="text". If "YES", the contrast of the 8×8 input block is reduced by the contrast reducer 60 prior to the DCT operation to improve the compression efficiency. The contrast reducer utilizes the fact that the DCT transformation is much better suited to decorrelating low-contrast image data as opposed to the large transitions encountered in typical text blocks. By reducing the contrast of the block prior to the DCT transformation and quantization, a higher quality reconstruction of the input block can be obtained at the output for the same amount of compression. In general, the contrast reducer 60 changes all the pixels with a value of zero to a larger value of "LOW", and changes all the pixels with a value of 255 to a smaller value of "HIGH". In a preferred embodiment of the present invention, the contrast reducer 60 reduces the contrast of the input "text" block by choosing "LOW"=112 and "HIGH"=144. Other values for "LOW" and "HIGH" can be used based on various system considerations without departing from the scope of the invention. An example of the output of the contrast reducer 60 is shown in FIG. 2B. If the output of the comparator box 50 is "NO", i.e., the 8×8 block being encoded is not text, the input block is directly fed into the DCT processing unit 70 that converts the 8×8 array of pixel values into a corresponding 8×8 array of spatial frequency values or DCT coefficients (FIG. 2C is an example).

The DCT coefficients representing a particular block are inputted to the quantization unit 80 along with the Q-table selected by the Q-table selector 40 for that block based on its block type. The Q-table is an 8×8 array of quantizer step sizes with the entry at each location represented by a single byte of information (values between 1 and 255). Each location in the array is identified by an index (k,l), where k specifies the row number (ranging from 0 to 7), and l specifies the column number (ranging from 0 to 7). For a given quantization table specification, the quantization procedure used in a preferred embodiment of the present invention is identical to the one used in the JPEG compression standard and is described below. The elements of the Q-table are used to normalize the DCT coefficients, and the results are rounded to the nearest integer to create the output quantizer indices. For a given input DCT coefficient, the output of the quantizer unit 80 is the quantizer index that results from quantizing that coefficient with its corresponding step size. The Q-tables used in the quantization process are stored in the header and are used by the decoder during the dequantization process as will be explained later.

If "block_type"="text", the Q-table chosen in a preferred embodiment of this invention is given by FIG. 2D. As an example, the (0,0) entry (top left) for this table is 8. This Q-table has been designed to maximize the compression performance and minimize the quantization loss for a typical text block when employed in conjunction with a thresholding operation at the decoder that will be discussed later. Those skilled in the art may modify the Q-table values without departing from the scope of the invention, for example the value 14 at location (0,7) can be replaced by 15 without a significant impact on performance. Also, depending on the exact configuration of the contrast reducer, the Q-table might be different from the one in FIG. 2D.

If "block_type"="mixed", the Q-table chosen in a preferred embodiment of this invention has a constant value of 1 at each location as illustrated by FIG. 2H. This is the highest quality encoding that can be performed with quantizing the DCT coefficients and it is used in this mode to preserve the quality of the reconstructed image to the highest degree possible.

If "block_type"="bi-level", the Q-table chosen in a preferred embodiment of this invention has a constant value of 8 at each location as illustrated by FIG. 2I. Finally, if the "block_type"="image", any well known JPEG compression Q-table utilized in the prior art to compress pictorial images can be used.

Once the image block is quantized, the quantized values are sent to and encoded via an entropy encoder 90 into a binary bit stream by any suitable means. The output of the block analyzer, namely the "block_type", is also inputted to the entropy coder 90 to be included in the bit stream as will be described later. In a preferred embodiment of this invention, the quantized DCT coefficients are encoded in a method identical to the one used in the JPEG standard. Briefly, in this method, first the quantized DC value of the block is encoded by using a DC Huffman code table to encode the difference between the quantized DC value of the current block and that of the previous block. Next, the quantized AC values are encoded using an AC Huffman code table to encode the {runlength/amplitude} pairs. If desired, the "block_type" parameter can also be used to select a specific set of AC and DC Huffman tables that may be better suited to the particular type of the block being encoded.

The information about the block type is needed at the decoder to select the appropriate decoding process and should be included in the compressed image file. In a preferred embodiment of this invention, the "block_type" parameter of each block is represented by a 2-bit fixed-length binary code that identifies one of the possible 4 block types. These 2-bit codewords are concatenated together in a single file that is included as part of the compressed image header. Alternatively, this information may be sent as a separate file or by other means without departing from the scope of the invention. Another approach is to use the entropy encoder to append the information about the block type to the beginning of the bit stream that represents the compressed block information.

Once compressed, the binary bit stream is either stored or transmitted through a low bandwidth communication channel.

Figure 3:
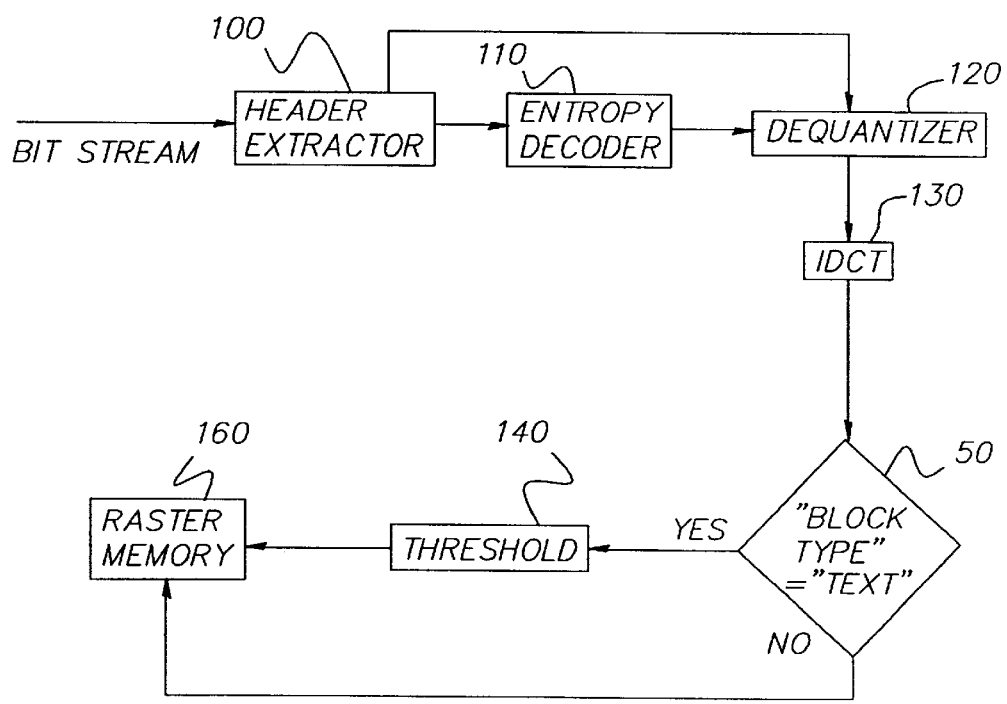
FIG. 3 is a block diagram illustrating the decoder employed in the present invention.

The decoder is depicted in FIG. 3. First, the Huffman tables and the Q-tables that have been used at the encoder to encode the various block types are extracted 100 from the header. In the case that the information about the "block_type" parameter of each block has been stored in the header, that information is also extracted at this stage. Otherwise, the entropy decoder 110 decodes the "block_type" parameter that has been appended to the beginning of the bit stream for that block. The "block_type" parameter is then used to select the appropriate Huffman decoding table to decode the bit stream that corresponds to that particular 8×8 block. Next, the decoded quantizer indices are inputted to the dequantization step 120. The objective of the dequantization process 120 is to convert the quantizer indices back into the actual quantized values. In a preferred embodiment of the present invention, a dequantization procedure identical to the one used in the JPEG compression standard is employed. In this simple procedure, the dequantizer multiplies each quantizer index by its corresponding quantization step size to get the dequantized value. The quantizer step sizes are given by the elements of the Q-table corresponding to that particular block type, and have already been extracted from the header by the decoder. An example of the output of the dequantizer for the example block of FIG. 2A is given in FIG. 2E.

An inverse discrete cosine transform (IDCT) processor 130 then reverses the DCT transform. An example of the output of the IDCT is shown in FIG. 2F for the example text block of FIG. 2A.

A feature of the present invention is a thresholding operation that is applied to the output of the IDCT for those blocks that have been classified as "text". This preserves the boundary information of the text and creates higher quality outputs at greater compression than those produced by the prior art where the text is compressed and decompressed in the same way as other types of image data. If the "block_type"="text", the 8×8 output of the IDCT is supplied to a thresholder 140, which converts all the values below 128 to a value of 0 and converts all the values at or above 128 to a value of 255. This thresholding, in combination with the specific Q-table for text, preserves the sharp edges of the text. FIG. 2G shows an example of the output of the thresholder 140 when its input is the example of FIG. 2F. It is to be understood that the threshold could be modified to other values without departing from the scope of the invention, as those skilled in the art will be able to determine. For all other block types, the IDCT values are rounded to 8 bits and are clipped to the range of (0,255) to constitute the reconstructed 8×8 block.

Finally, the 8×8 reconstructed blocks are sent to raster memory that re-assembles the blocks of data back into its original form and size.

The invention has been described with reference to a preferred embodiment. However, it will be appreciated that variations and modifications can be effected by a person of ordinary skill in the art without departing from the scope of the invention.

We claim:

1. A method for compressing a digital image having both saturated text and/or line art and pictorial imagery, the method comprising the steps of:

(a) receiving the digital image as blocks of pixels;

(b) analyzing the block content to determine if all or any combination of the saturated text and/or line art, pictorial imagery or other types of image data are present;

(c) assigning the saturated text and/or line art, the pictorial imagery, the other types of image data to one of a plurality of categories;

(d) compressing the block of saturated text and/or line art, if any, according to a JPEG compression method using a first quantization matrix;

(e) compressing the pictorial imagery, if any, according to the JPEG compression method while using a second quantization matrix different from the first quantization matrix;

(f) compressing the other types of imagery, if any, according to the JPEG compression method corresponding to other predetermined quantization matrices different from the first quantization matrix;

(g) providing information about the assigned image category for each pixel block of the digital image to a decoder; and (h) using the JPEG compression with the first, second, and other predetermined quantization matrices in steps (d)–(f) so that the first, second, and other predetermined quantization matrices minimizes any data loss resulting from the JPEG compression.

2. The method as in claim 1 further comprising, prior to step (d), applying a contrast reducer to the saturated text and/or line art.

3. The method as in claim 1, further comprising transmitting a code in a header for each image block which code identifies to a decoder whether the image block is saturated text and/or line art, pictorial imagery, or the other types of imagery.

4. The method as in claim 1 further comprising transmitting in the compressed image header a set of concatenated codewords which code identifies to a decoder whether each image block is saturated text and/or line art, pictorial imagery, or the other types of imagery.

5. The method as in claim 1, wherein step (b) includes using text and pictorial images, and bi-level images as the other types of image data.

6. The method as in claim 1 further comprising determining if the block contains only values of 0 and 255 which indicates saturated text and/or line art by.

7. The method as in claim 1 further comprising determining if the block contains three unique values between 1 and 254 which indicates pictorial imagery.

8. The method as in claim 5 further comprising determining if the block contains only two unique values selected from a range of 1 to 254 which indicates bi-level image.

9. The method as in claim 5 further comprising determining if the block contains at least one value between 0 and 255 inclusive in addition to at least one value equal to 0 or 255 which indicates both saturated text and/or line art imagery and pictorial imagery.

10. The method as in claim 1 further comprising using a first 8×8 quantization matrix if the block is saturated text and/or line art, wherein the first 8×8 quantization matrix is

| 8 | 8 | 8 | 8 | 9 | 10 | 12 | 14 |
|---|---|---|---|---|----|----|----|
| 8 | 8 | 8 | 8 | 9 | 10 | 12 | 15 |
| 8 | 8 | 8 | 9 | 10 | 12 | 14 | 32 |
| 8 | 8 | 9 | 11 | 13 | 15 | 32 | 32 |
| 9 | 9 | 10 | 13 | 16 | 32 | 32 | 32 |
| 10 | 10 | 12 | 15 | 32 | 32 | 32 | 32 |
| 12 | 12 | 14 | 32 | 32 | 32 | 32 | 32 |
| 14 | 15 | 32 | 32 | 32 | 32 | 32 | 32. |

11. The method as in claim 5 further comprising using a second 8×8 quantization matrix if the block is bi-level, wherein the second quantization matrix is 8 at each location.

12. The method as in claim 1 further comprising using a third 8×8 quantization matrix if the block is both saturated text and/or line art, and pictorial imagery, wherein the third quantization matrix is 1 at each location.

13. A method for compressing a digital image having both saturated text and/or line art and pictorial imagery, and then decompressing the digital image, the method comprising the steps of:

(a) receiving the digital image as blocks of pixels;

(b) analyzing the block content to determine if all or any combination of the saturated text and/or line art, pictorial imagery or other types of image data are present;

(c) assigning the saturated text and/or line art, the pictorial imagery, the other types of image data to one of a plurality of categories;

(d) compressing the block of saturated text and/or line art, if any, according to a JPEG compression method using a first quantization matrix;

(e) compressing the pictorial imagery, if any, according to the JPEG compression method while using a second quantization matrix different from the first quantization matrix;

(f) compressing the other types of imagery, if any, according to the JPEG compression method, and using a corresponding other predetermined quantization matrix different from the first quantization matrix;

(g) providing information about the assigned image category for each pixel block of the digital image to a decoder, (h) using the JPEG compression with the first, second, and other predetermined quantization matrices in steps (d)–(f) so that the first, second, and other predetermined quantization matrices minimizes any data loss resulting from the JPEG compression; and (i) applying a threshold operation to the decompressed saturated text and/or line art, wherein the threshold operation converts the value of all the pixels below a predetermined threshold to a minimum pixel value and converts the value of all the pixels at or above the predetermined threshold to a maximum pixel value.

14. The method as in claim 13, wherein step (h) includes using a threshold value halfway between a minimum and maximum pixel values in the saturated text and/or line art.

15. The method as in claim 13 further comprising, prior to step (d), applying a contrast reducer to the saturated text and/or line art.

16. The method as in claim 13 further comprising transmitting a code in a header for each image block which code identifies to a decoder whether the image block is saturated text and/or line art, pictorial imagery, or the other types of imagery.

17. The method as in claim 13 further comprising transmitting in the compressed image header a set of concatenated codewords which code identifies to a decoder whether each image block is saturated text and/or line art, pictorial imagery, or the other types of imagery.

18. The method as in claim 13, wherein step (b) includes using text and pictorial images, and bi-level images as the other types of image data.

19. The method as in claim 13 further comprising determining if the block contains only values of 0 and 255 which indicates saturated text and/or line art by.

20. The method as in claim 13 further comprising determining if the block contains three unique values between 1 and 254 which indicates pictorial imagery.

21. The method as in claim 18 further comprising determining if the block contains only two unique values selected from a range of 1 to 254 which indicates bi-level image.

22. The method as in claim 18 further comprising determining if the block contains at least one value between 0 and 255 inclusive in addition to at least one value equal to 0 or 255 which indicates both saturated text and/or line art imagery and pictorial imagery.

23. The method as in claim 13 further comprising using a first 8×8 quantization matrix if the block is saturated text and/or line art, wherein the first 8×8 quantization matrix is:

| 8  | 8  | 8  | 8  | 9  | 10 | 12 | 14  |
|----|----|----|----|----|----|----|-----|
| 8  | 8  | 8  | 8  | 9  | 10 | 12 | 15  |
| 8  | 8  | 8  | 9  | 10 | 12 | 14 | 32  |
| 8  | 8  | 9  | 11 | 13 | 15 | 32 | 32  |
| 9  | 9  | 10 | 13 | 16 | 32 | 32 | 32  |
| 10 | 10 | 12 | 15 | 32 | 32 | 32 | 32  |
| 12 | 12 | 14 | 32 | 32 | 32 | 32 | 32  |
| 14 | 15 | 32 | 32 | 32 | 32 | 32 | 32. |

24. The method as in claim 18 further comprising using a second 8×8 quantization matrix if the block is bi-level, wherein the second quantization matrix is 8 at each location.

25. The method as in claim 3 further comprising using a third 8×8 quantization matrix if the block is both saturated text and/or line art, and pictorial imagery, wherein the third quantization matrix is 1 at each location.

* * * * *

UNITED STATES PATENT AND TRADEMARK OFFICE
CERTIFICATE OF CORRECTION

PATENT NO. : 6,625,323 B2
DATED : September 23, 2003
INVENTOR(S) : Thomas A. Henderson et al.

It is certified that error appears in the above-identified patent and that said Letters Patent is hereby corrected as shown below:

<u>Title Page,</u>
Item [54], Title, please insert -- IMAGE -- after "DIGITAL".

<u>Column 4,</u>
Line 17, "50" should be -- 30 --.

<u>Column 6,</u>
Line 61, -- 160 -- should be added after "memory".

<u>Column 10,</u>
Line 22, "3" should be -- 13 --.

Signed and Sealed this

Eighth Day of June, 2004

JON W. DUDAS
*Acting Director of the United States Patent and Trademark Office*